(12) United States Patent
Green et al.

(10) Patent No.: US 10,979,142 B2
(45) Date of Patent: Apr. 13, 2021

(54) VEHICLE DATA TRANSFER SYSTEM

(71) Applicant: Universal City Studios LLC, Universal City, CA (US)

(72) Inventors: Tracy Green, Ocoee, FL (US); Sean Fitzpatrick, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/597,426

(22) Filed: Oct. 9, 2019

(65) Prior Publication Data

US 2020/0186246 A1 Jun. 11, 2020

Related U.S. Application Data

(60) Provisional application No. 62/776,013, filed on Dec. 6, 2018.

(51) Int. Cl.

| | | |
|---|---|---|
| *H04B 10/50* | (2013.01) | |
| *H04B 10/112* | (2013.01) | |
| *H04B 10/80* | (2013.01) | |
| *H04B 10/66* | (2013.01) | |

(52) U.S. Cl.
CPC ......... *H04B 10/1123* (2013.01); *H04B 10/50* (2013.01); *H04B 10/66* (2013.01); *H04B 10/80* (2013.01)

(58) Field of Classification Search
CPC .... H04B 10/1123; H04B 10/80; H04B 10/66; H04B 10/50
See application file for complete search history.

(56) References Cited

U.S. PATENT DOCUMENTS

| | | | |
|---|---|---|---|
| 6,525,854 B1 | 2/2003 | Takahashi et al. | |
| 10,122,449 B2 | 11/2018 | Norbert et al. | |
| 10,205,457 B1* | 2/2019 | Josefsberg | G01S 7/032 |
| 2011/0306357 A1* | 12/2011 | Alizadeh-Shabdiz | G01S 5/021 455/456.1 |
| 2017/0313332 A1* | 11/2017 | Paget | H04N 5/23203 |
| 2018/0088208 A1 | 3/2018 | Gagrani et al. | |
| 2019/0176830 A1* | 6/2019 | Lei | B60W 30/18163 |
| 2019/0187235 A1* | 6/2019 | Kang | G01C 21/28 |
| 2019/0318619 A1* | 10/2019 | Iwano | G08G 1/09 |

FOREIGN PATENT DOCUMENTS

WO 2019206809 10/2019

OTHER PUBLICATIONS

PCT/US2019/064247 International Search Report and Written Opinion Jun. 24, 2020.

\* cited by examiner

*Primary Examiner* — Dzung D Tran
(74) *Attorney, Agent, or Firm* — Fletcher Yoder, P.C.

(57) ABSTRACT

A dynamic short range free-space optical (FSO) communication system that is specially designed for use in dynamically moving targets that are within a short range of distance (e.g., 0-50 meters) is provided herein. Using specially designed transmitters and/or receivers, the dynamic short range FSO communication system may facilitate high-bandwidth communication, while allowing several line of sight alignment options that may be useful for somewhat unpredictable vehicle movement.

20 Claims, 5 Drawing Sheets

VEHICLE DATA TRANSFER SYSTEM

CROSS-REFERENCE TO RELATED APPLICATION

This application claims the benefit of U.S. Provisional Application No. 62/776,013, entitled "VEHICLE DATA TRANSFER SYSTEM," filed Dec. 6, 2018, which is incorporated herein by reference in its entirety for all purposes.

BACKGROUND

The present disclosure relates generally to data transfer, and more specifically to systems for providing high-bandwidth and short distance data transmission to vehicles via a dynamic short range free-space optical transmission system.

Generally, vehicles are objects used to transport people and/or goods. As vehicles become increasingly sophisticated, complex data-dependencies may exist to facilitate an increasing amount of functionality for the vehicles. For example, one type of vehicle may be an autonomous/partially-autonomous automobile that is able to self-govern certain driving functions, such as lane-changing, fully automatic driving to a provided destination, or the like. As may be appreciated, autonomous functions may be highly data-dependent, relying on provision of up-to-date driving rules and/or road conditions to facilitate their actions.

In another example, amusement park-style rides may include ride vehicles that carry passengers along a ride path, for example, defined by a track. Over the course of the ride, the ride vehicles may be tasked with performing various effects, such as actuating movement in a cabin of the ride vehicle, independent from an underlying transport system of the ride vehicle. Further, the ride vehicles may be tasked with triggering presentation of lighting, audio, video, or the like and/or may be tasked with other actions as well, such as providing interactive features, such as electronic games, etc. As may be appreciated, these functions of the ride vehicle may rely heavily on electronic data provided to the ride vehicle.

Unfortunately, as the data-dependent functionalities of vehicles increase, the amount of data that the vehicle is dependent upon may increase. Further, traditional mechanisms for providing data to these vehicles are burdensome and time consuming. For example, in systems that rely on hard wired connections (e.g., Universal Serial Bus (USB) or other physical connection) and or machine-readable medium (USB drives, Digital Video Disc (DVD), etc.) data transfers may require complex robotic intervention and/or human intervention, which may be quite burdensome. Further, traditional wireless technologies used to transmit data over short ranges (e.g., Wi-Fi, Bluetooth, etc.) may lack sufficient bandwidth for the increased data load requirements of the vehicles.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

To facilitate high-bandwidth and short distance transmission of data to ride vehicles, a dynamic short range free-space optical (FSO) communication system is provided. The dynamic short range FSO communication system is specially designed for use in dynamically moving targets that are within a short range of distance (e.g., 0-50 meters). Using specially designed transmitters and/or receivers, the dynamic short range FSO communication system may facilitate high-bandwidth communication, while allowing several line of sight alignment options that may be useful for somewhat unpredictable vehicle movement.

In an embodiment, a tangible, non-transitory, machine-readable medium includes machine-readable instruction that, when executed by one or more processors of a short-range free space optical (FSO) transmitter, cause the short-range FSO transmitter to: identify positional information related to an FSO receiver. Based upon the positional data, the transmitter may identify one or more dynamic transmission parameters applicable to the position of the FSO receiver and provide an FSO transmission using the implemented one or more dynamic transmission parameters.

In another embodiment, a dynamic short-range free range optical (FSO) transmitter, includes: range detection circuitry that identifies a distance range between the short-range FSO transmitter and a target FSO receiver. Transmission adjustment circuitry of the transmitter adjusts one or more transmission parameters based upon the distance range. Transmission generation circuitry identifies data to be transmitted to the target FSO receiver and generates and transmits an FSO transmission representing the data, in accordance with the one or more transmission parameters.

In yet another embodiment, a dynamic short-range FSO receiver includes a plurality of sensors, each oriented in different directions, enabling reception of a free space optical (FSO) transmission from a short-range FSO transmitter from a plurality of orientations. The receiver further includes a control system that receives the FSO transmission from the short-range FSO transmitter; and identifies and stores data represented by the FSO transmission in a tangible, non-transitory, machine-readable medium that is communicatively coupled to the dynamic short-range FSO receiver.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While the following discussion is generally provided in the context of amusement park-style rides that may include a plurality of closed-loop or open-loop pulley systems to drive motion of a carriage which may secure and house a ride vehicle, it should be understood that the embodiments disclosed herein are not limited to such entertainment contexts. Indeed, the provision of examples and explanations in such an entertainment application is to facilitate explanation by providing instances of real-world implementations and applications. As such, it should be appreciated that the embodiments disclosed herein may be useful in other applications, such as transportation systems (e.g., train systems, building and floor connecting systems), elevator systems, and/or other industrial, commercial, and/or recreational human transportation systems, to name a few.

With the forgoing in mind, present embodiments include systems and methods for transmitting electronic data to a vehicle via short range free-space Optical (FSO) communications. While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

Figure 1:
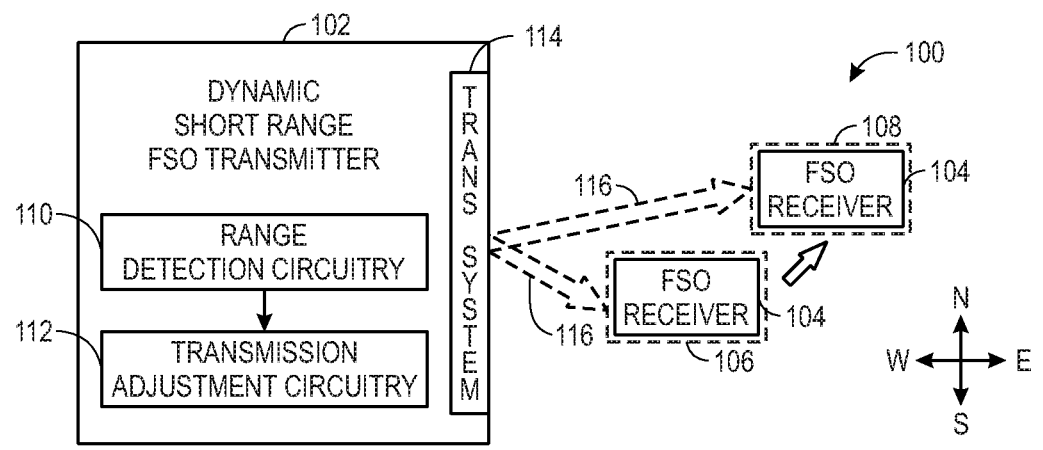
FIG. 1 is a schematic diagram, illustrating a dynamic short range free-space optical (FSO) system that is providing varied transmission based upon varied location of an FSO receiver, in accordance with an embodiment of the present disclosure.

Turning first to an overview of components of a dynamic short range FSO system, FIG. 1 is a schematic diagram, illustrating a dynamic short range free-space optical (FSO) system 100 that is providing varied transmission based upon varied location of an FSO receiver, in accordance with an embodiment of the present disclosure. The dynamic short range FSO system 100 includes a transmitter 102 that transmits data by providing light over line of site to a receiver 104 of the system 100. As illustrated, the receiver 104 may dynamically change position (e.g., from position 106 to position 108). For example, as illustrated the receiver 104 moves from a position 106 with relatively shorter distance from the transmitter 102 to a position 108 with a relatively larger distance.

In short range FSO transmission, the transmission distance is an important factor. When a receiver 104 is too close to a transmitter 102, the receiver may experience an over saturation of light that causes the light to be uninterpretable as an electronic data transmission. Conversely, when the receiver 104 is too far away from the transmitter 102, the receiver 104 may not receive enough light to interpret the light as an electronic data transmission. Accordingly, the transmitter 102 may mitigate these problems using included range detection circuitry 110 and transmission adjustment circuitry 112.

The range detection circuitry 110 may detect a range of a target from transmission of electronic data (e.g., the receiver 104). For example, the range detection circuitry 110 may include a camera and/or other circuitry that detects a distance and/or positional change between a transmission system 114 (e.g., light emitter) of the transmitter 102 and the receiver 104. For example, the range detection circuitry 110 may detect the position 106 and/or position 108 where the receiver 104 is positioned. A range and/or location deviation from the transmission system 114 may be calculated and provided for use in transmission adjustment circuitry 112. The transmission adjustment circuitry 112 may adjust characteristics of the transmission provided by the transmission system 114, based upon the determined range identified by the range detection circuitry 110. For example, characteristics may include a power provision to the transmission system 114, a magnitude of light output from the transmission system 114, a light beam positioning for the emitted light, etc. In the current embodiment, at position 108, the receiver 108 is at a relatively farther distance than at position 106. Accordingly, because the receiver 108 is at a farther distance at position 108, additional intensity of light may be provided by the transmission system 114. In some embodiments, this may be provided by increasing an amount of power inputted to the transmission system 114. In other embodiments, the light intensity may be controlled independent from the power provided to the transmission system 114.

Additionally and/or alternatively, transmission beam position may also be dynamically altered. For example, in the current embodiment, when the receiver 104 is at position 108, it is north of position 104. The transmission system 114 may direct a beam of transmission 116 based upon a position of the receiver 104. Thus, the receiver, may direct the light beam 116 north when the receiver 104 is at position 108. Conversely, the transmission system may direct the beam of transmission south when the receiver 104 is at position 106. The transmission characteristics may be adjusted during transmission. That is, if the receiver 104 moves during provision of the transmission beam 116, the transmission adjustment circuitry 112 may dynamically adjust the transmission beam 116 during the movement of the receiver 104.

Figure 2:
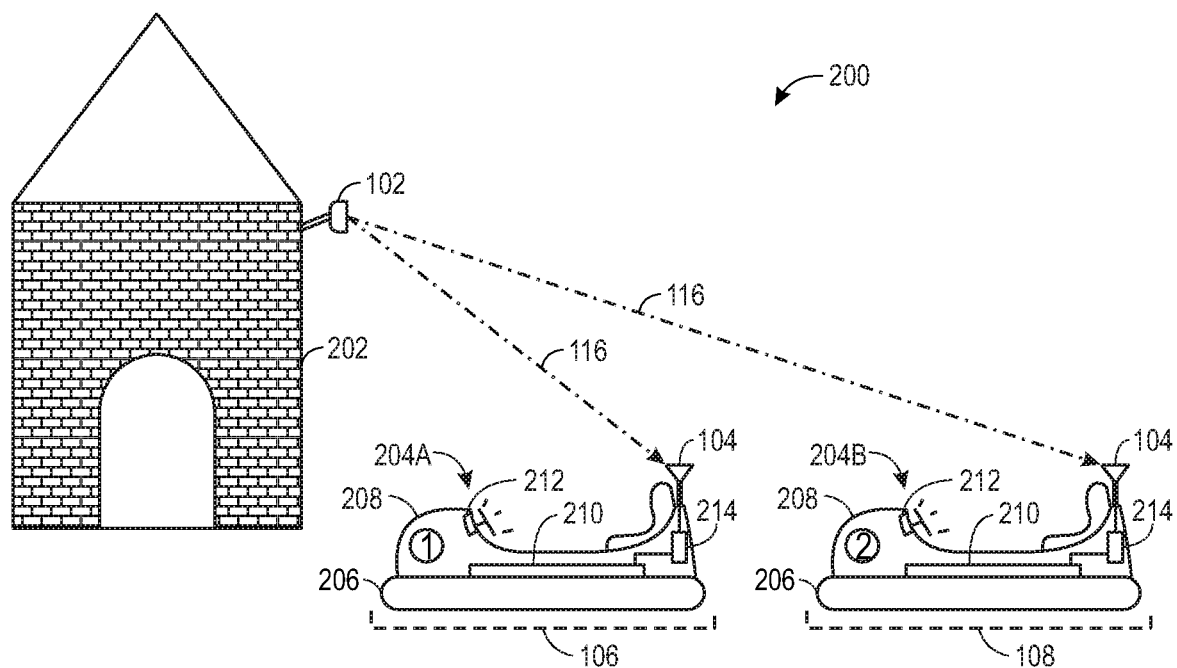
FIG. 2 is a schematic diagram of a ride system that uses the short range FSO system of FIG. 1, in accordance with an embodiment of the present disclosure.

Turning now to a specific embodiment, FIG. 2 is a schematic diagram of a ride system 200 that uses the short range FSO system 100 of FIG. 1, in accordance with an embodiment of the present disclosure. As illustrated, a dynamic short range FSO transmitter 102 is affixed to a structure 202. The transmitter 102 is tasked with transmitting ride vehicle data over FSO communications to the ride vehicles 204A and 204B. Each of the ride vehicles 204A and 204B include a transport system 206 that facilitates movement of the ride vehicles 204A and 204B. The ride vehicles 204A and 204B also include a cabin 208 where a ride participate is housed during the ride. The cabin 208, in some embodiments, may provide ride features, such as cabin movement, via cabin effect actuation equipment 210, upon triggering events. For example, upon an earthquake feature of the ride, the cabin effect actuation equipment 210 may cause the cabin to vibrate or move. The programming (e.g., conditions) for the cabin effect actuation equipment 210 may be received a dynamic short range FSO receiver 104 that receives transmitted data via a beam transmission 116 from the transmitter 102. For example, data used to program the cabin effect actuation equipment 210 may be provided from the transmitter 102 to the ride vehicles 206A and 206B by providing a light beam transmission 116 to the receivers 104. The receivers 104 may receive the beam transmission 116 and determine electronic data represented by the beam transmission 116. The electronic data may be stored in a control system 214 of the ride vehicles 204A and 204B, allowing the control system 214 to self-install the electronic data. The self-installed electronic data may define particular conditions for actuating features of the cabin effect actuation equipment 210, such as providing cabin movement, etc. In some embodiments, the transmitter 102 may be aware of particular ride vehicle 204A and 204B and/or cabin 208 movements that will be implemented based upon the cabin effect actuation equipment 210. In such embodiments, the transmitter may adjust transmission characteristics based upon these known changes. For example, the transmitter 102 may be aware that the cabin 208 will tilt left by 5 degrees at a certain time period, which may cause a corresponding movement of the receiver 104. Accordingly, the transmitter 102 may proactively provide beam steering to account for the cabin 208 movement, based upon pre-existing knowledge of the cabin movement.

Other data may be provided to the ride vehicles 204A and 204B. In some embodiments, an interactive feature 212 (e.g., a video gaming console/display) is positioned within the ride vehicles 204A and 204B. The interactive feature 212 programming may also be provided by the transmitter 102. For example, when the interactive feature 212 is a video gaming console/display, video game data and/or the video game code itself may be provided to the ride vehicles 204A and 204B via the transmitter 102.

Because FSO communications are high-bandwidth (e.g. 1-10 Gigabits/second), the transmission of ride vehicle data can be completed in a relatively rapid fashion over traditional wireless communication technologies. However, as mentioned above, because FSO communications rely on aligned line of sight pathways between the transmitter 102 and the receiver 104, the transmitter may adjust the transmission to account for varied positioning of the ride vehicles 204A and 204B, as discussed herein. By adjusting the transmission, the transmitter 102 can facilitate quality FSO transmission, despite variances in the position of ride vehicles (e.g., position 106 versus position 108).

Figure 3A:
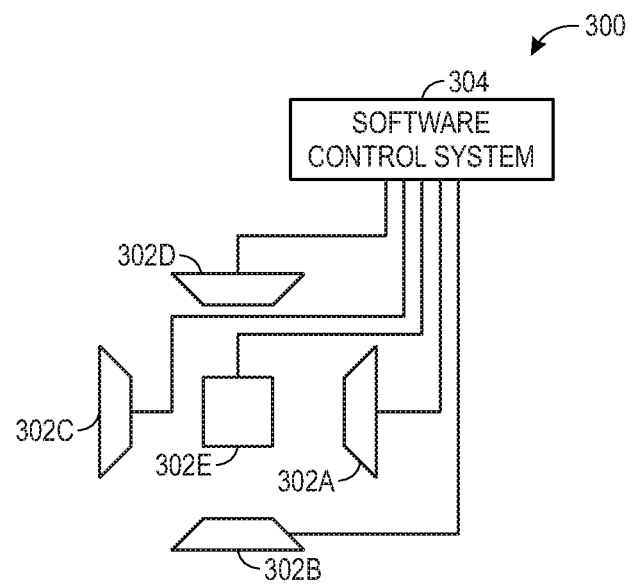
FIGS. 3A and 3B are schematic diagrams, illustrating short range FSO receiver configurations useful for dynamic short range FSO transmission of data, in accordance with an embodiment of the present disclosure.

FIG. 3A illustrates a first short range FSO receiver 104 configuration 300 useful for dynamic short range FSO transmission of data, in accordance with an embodiment of the present disclosure. The receiver 104 may be affixed to a vehicle, such as the ride vehicles 204A and 204B of FIG. 2. In the embodiment of FIG. 3A, individual sensors 302A, 302B, 302C, 302D, and 302E are each communicatively coupled to a software control system 304. Each of the sensors 302A, 302B, 302C, 302D, and 302E includes a different orientation, enabling a transmitter 102 to contact the receiver 104 at a variety of different orientations, which may be useful for vehicles that may dynamically change orientations from time to time. The sensors 302A, 302B, 302C, and 302D are oriented at an angle that will provide sufficient transmission beam 116 contact from the transmitter 102 to the sensors 302A, 302B, 302C, and 302D. Sensor 302E is oriented for use when the transmitter 102 is overhead of the receiver 104. Any number of sensors may be used in the receiver 104. For example, fewer sensors may be used in vehicles that are expected to be in a limited number of orientations (e.g., forward-facing, side-facing, top-facing, or rear-facing orientation) while in the transmission range. In such a scenario, only sensors that are likely to receive transmissions from the transmitter 102 may be present in the receiver 104, while others can be left out of the configuration 300.

Figure 3B:
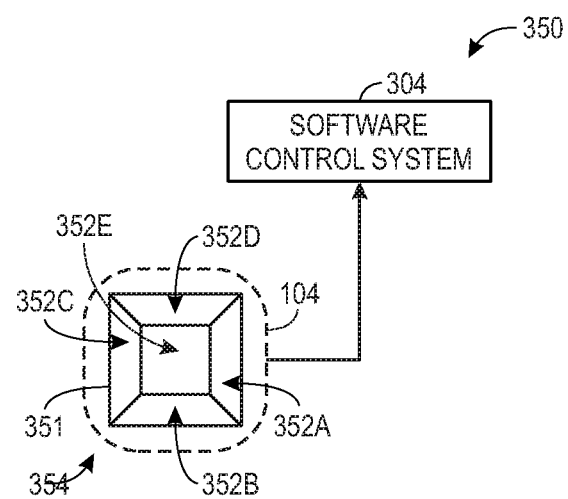

FIG. 3B illustrates a second short range FSO receiver configuration 350 useful for dynamic short range FSO transmission of data, in accordance with an embodiment of the present disclosure. In this embodiment, the sensors 352A, 352B, 352C, 352D, and 352E are all joined and are part of a common receiver 104. The common receiver 104 may be positioned on a portion of the vehicle that is viewable by the transmitter 102 from all desired orientations. Similar to the receiver 104 of FIG. 3A, each of the sensors 352A, 352B, 352C, 352D, and 352E includes a different orientation, enabling a transmitter 102 to contact the receiver 104 at a variety of different orientations, which may be useful for vehicles that may dynamically change orientations from time to time. The sensors 352A, 352B, 352C, and 352D are oriented at an angle that will provide sufficient transmission beam 116 contact from the transmitter 102 to the sensors 352A, 352B, 352C, and 352D. Sensor 352E is oriented for use when the transmitter 102 is overhead of the receiver 104. Any number of sensors may be used in the receiver 104. For example, fewer sensors may be used in vehicles that are expected to be in a limited number of orientations (e.g., forward-facing, side-facing, top-facing, or rear-facing orientation) while in the transmission range. In such a scenario, only sensors that are likely to receive transmissions from the transmitter 102 may be present in the receiver 104, while others can be left out of the configuration 300. As illustrated in FIG. 3B, unlike the sensors of FIG. 3A, each of the sensors 352A, 352B, 352C, 352D, and 352E are part of a common sensor apparatus 354. In some instances, it may be easier to place the common sensor apparatus 354 than placing individual sensors as done in the embodiments of FIG. 3A.

Figure 4:
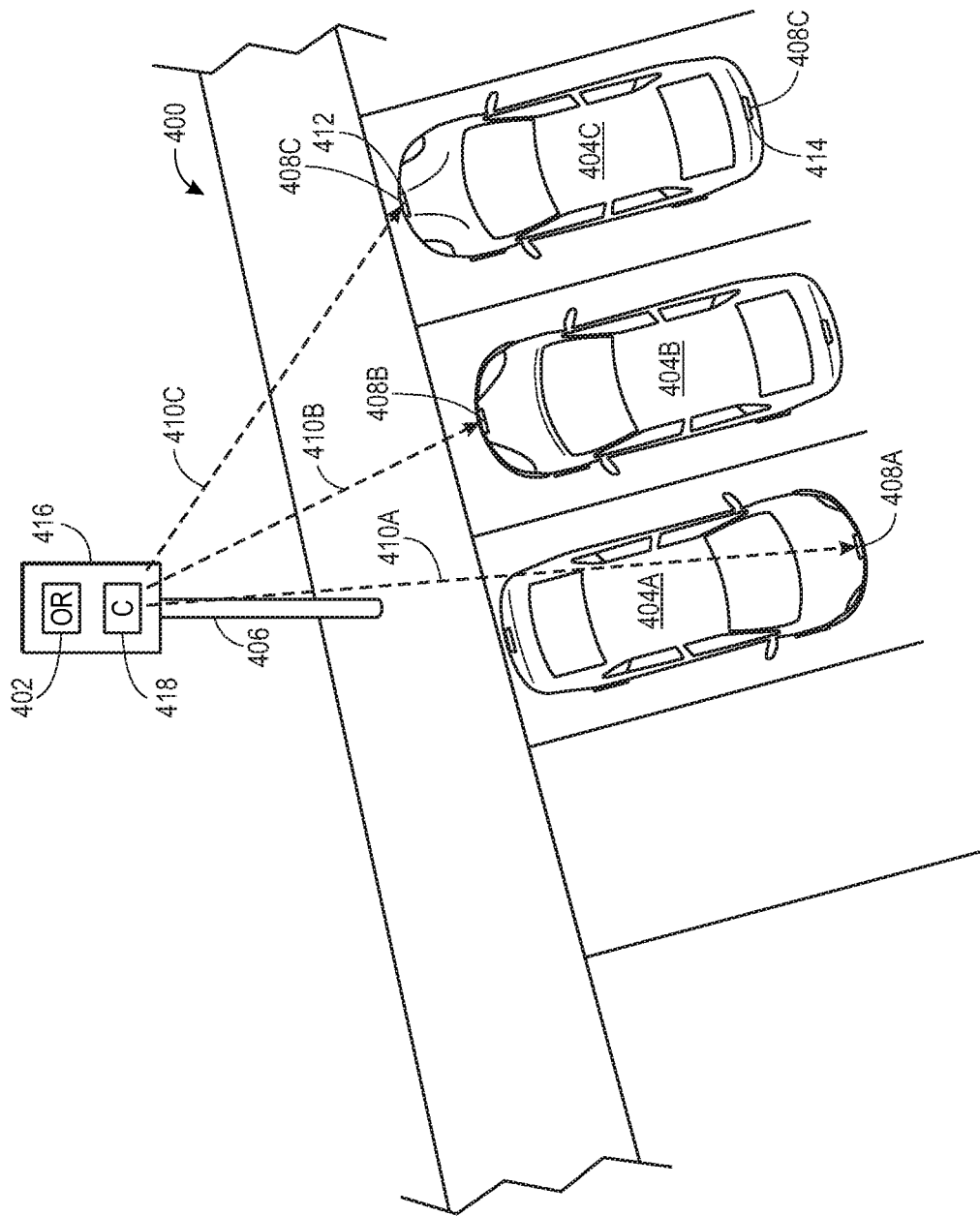
FIG. 4 is a schematic diagram, illustrating an automotive system that uses a short range FSO system, in accordance with an embodiment of the present disclosure.

As mentioned, the dynamic short range FSO transmission may be used to transmit data to dynamically moving targets. For further discussion, FIG. 4 is a schematic diagram, illustrating an automotive system 400 that uses a short range FSO transmitter 402 to transmit data to automobiles 404A, 404B, and 404C, in accordance with an embodiment of the present disclosure. As illustrated, the dynamic short range FSO transmitter 402 is positioned on a base 406, which enables the transmitter to have line of sight contact with dynamic short range FSO receivers 408A, 408B, and 408C of the respective automobiles 404A, 404B, and 404C. As illustrated, the automobile 404A is rear-facing, meaning that the automobile 404A has backed into a designated spot (e.g., parking spot). Due to the positioning of the dynamic short range FSO transmitter 402 and/or receiver 408A, the transmitter 402 is able to maintain a line of site with the receiver 408A and thus is able to provide data transmission 410A. Automobile 404B is front-facing, meaning it pulled into a designated spot (e.g., parking spot) face first. Further, receiver 408B is positioned on the front of the automobile 404B. Thus, the transmitter 402 is can provide transmission data 410B to the receiver 408B. As discussed above regarding FIGS. 3A and 3B, in some instances, the receiver may utilize multiple sensors. For example, vehicle 404C has a receiver 408C that uses a front-facing sensor 412 and a rear facing sensor 414. In such instances, the transmitter 402 may identify a most suitable sensor from the set of sensors used by the receiver 408C. For example, the most suitable sensor may be a closest sensor to the transmitter 402, a sensor having a relatively largest unobstructed surface area, etc. In the current embodiment, sensor 412 is selected, as this sensor is both the closest to the transmitter 402 and has the highest visible surface area by the transmitter 402 of the two sensors 412 and 414. Thus, the transmitter may provide transmission data 410C to the sensor 412 of the receiver 408C.

The transmitter 402 may mechanically or otherwise adjust a transmission beam. For example, motors within the transmitter 402 may orient a beam source toward a target sensor/receiver. In some embodiments, multiple beam sources may exist. The multiple beam sources may be positioned differently and/or oriented differently (e.g., at different angles). The transmitter 402 may select one or more of the multiple beam sources most suitable for generating a beam oriented toward the target sensor/receiver. The target receiver may be identified by optical recognition circuitry 416 (e.g., a processor and camera) of the transmitter 402 that recognizes vehicle sensors/receivers. Additionally and/or alternatively, the transmitter 402 may include a controller 418, which may be communicatively coupled to one or more vehicles (e.g., automobile 408C) to receive, from the one or more vehicles, information useful for selecting a target sensor/receiver. For example, the automobile 408C may be communicatively coupled to controller 418 over a wireless communication technology, such as Bluetooth or Wi-Fi. Through this communicative coupling, automobile 408C may provide information such as a positioning, orientation, etc. of the automobile 408C, enabling the transmitter 402 to select sensor 412 for short-range FSO communications. In some embodiments, the automobile 408C may simply provide an indication to the transmitter 402 identifying that the sensor 412 should be targeted by the transmitter 402 for short-range FSO communications.

Figure 5:
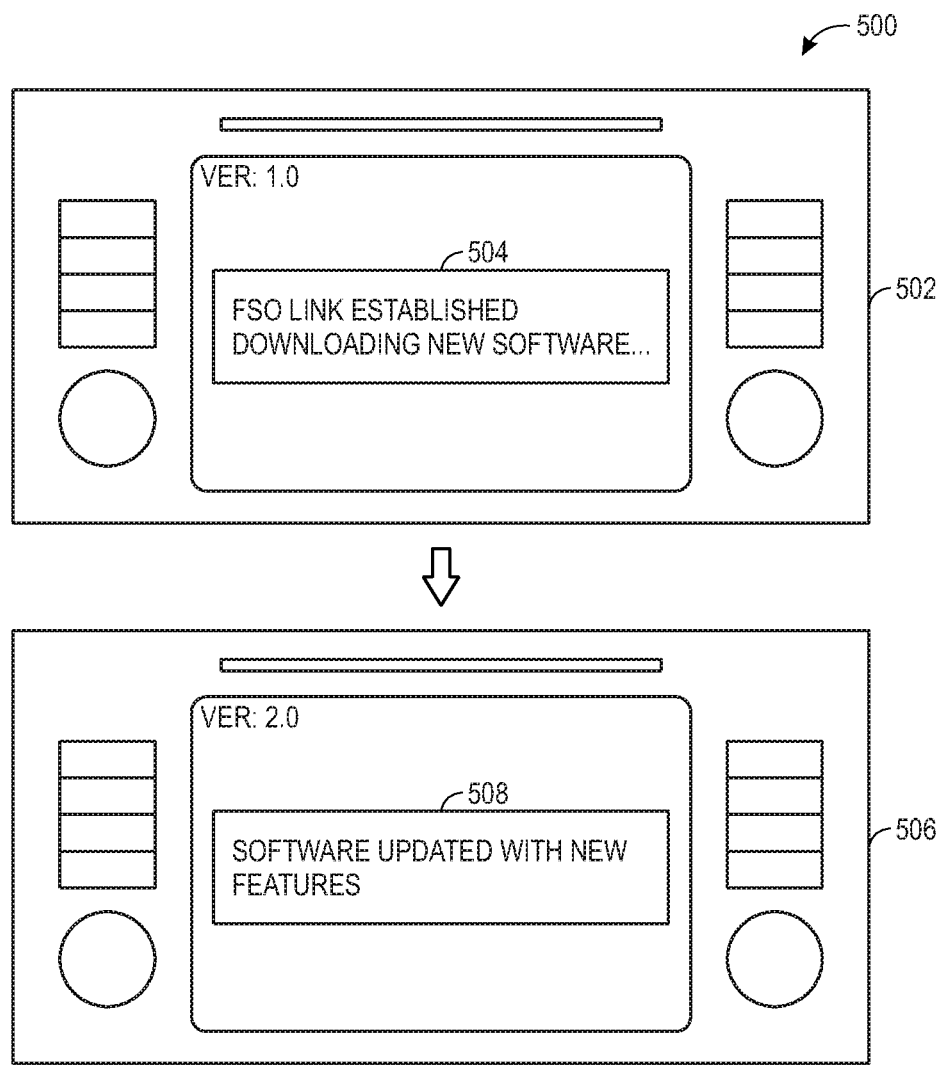
FIG. 5 is a schematic diagram of a head unit of one of automobiles in FIG. 4, in accordance with an embodiment of the present disclosure.

Turning now to a discussion of the data transmitted by the dynamic short-range FOS communications, FIG. 5 is a schematic diagram of a head unit progression 500 of one of automobiles in FIG. 4, in accordance with an embodiment of the present disclosure. As mentioned above, many different types of data may be transferred by short-range FSO communications. For example, in one embodiment, vehicle software updates (e.g., firmware, global positioning system maps, etc.) may be transferred to the vehicle, such that the software updates may be applied to the vehicle's computing systems. In the head unit progression 500, a first stage 502 illustrate a notification 504 indicating that an FSO link has been established with the transmitter 402 of FIG. 4. The notification 504 also provides an indication that the FSO link is facilitating download of new software. At a second stage 506, after the software updates are downloaded and applied, a new notification 508 is presented, indicating that the software has be updated.

Figure 6:
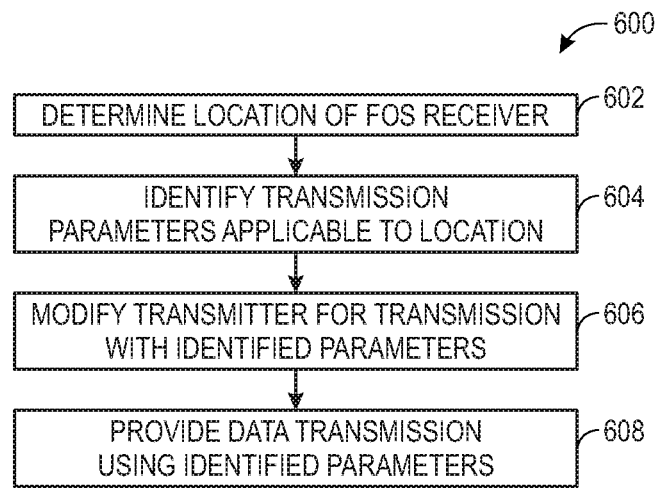
FIG. 6 is a flowchart, illustrating a process for dynamic data transmission via a dynamic short range FSO transmitter, in accordance with an embodiment of the present disclosure.

FIG. 6 is a flowchart, illustrating a process 600 for dynamic data transmission via a dynamic short range FSO transmitter, in accordance with an embodiment of the present disclosure. As mentioned above, a location of the FOS receiver/sensor is determined (block 602). This can be done using optical recognition circuitry and/or a controller as discussed above regarding FIG. 4. For example, the optical recognition circuitry may use a camera and processor to recognize receivers for targeting. The receivers may include specially identifying traits, which make them relatively easy to recognize. For example, the receivers may be highly reflective and/or may be colored with a color that can be spotted by the optical recognition circuitry. Further, in some embodiments, a controller may receive data (e.g., from the vehicles themselves) that provide data that helps in selection of the targeted receivers. For example, an explicit indication of the location of a particular receiver/sensor to target may be provided by the vehicle to the controller.

Figure 7:
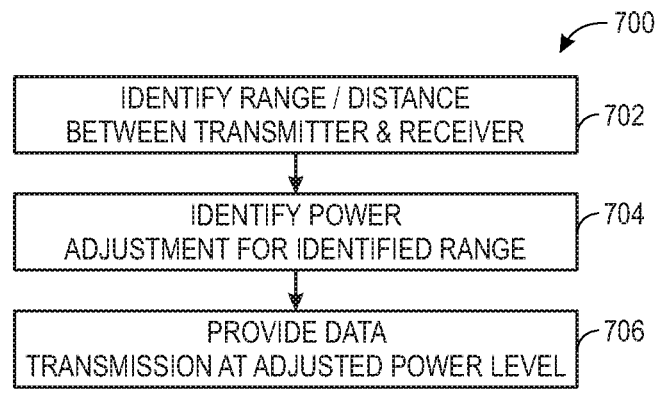
FIG. 7 is a flowchart, illustrating a process for dynamic power adjustment of a dynamic short range FSO transmitter, in accordance with an embodiment of the present disclosure.

Once the target receiver/sensor is identified, transmission parameters applicable to the location of the receiver are identified (block 604). For example, depending on a range between the transmitter and receivers, a transmission alteration may be beneficial. As mentioned above, if a transmission beam is too powerful, the receiver may be saturated by an overly powerful beam. In contrast, if the transmission beam is too weak, the receiver may have difficulty interpreting the beam to obtain the resultant data represented by the beam. To adjust the transmission beam, a transmission source power adjustment and/or a particular transmission filter may be applied. These adjustments may calibrate the transmission beam for the particular location/range. For example, reduced transmission source power may result in reduced transmission beams. FIG. 7 is a flowchart, illustrating a process 700 for dynamic power adjustment of a dynamic short range FSO transmitter, in accordance with an embodiment of the present disclosure. As mentioned previously, a range/distance between the transmitter and the receiver is identified (block 702). Based upon the identified range/distance, a power adjustment selection is determined (block 704). For example, a data table may be indexed based upon range/distances. Additional data in the data table may indicate particular transmission source power settings to use for corresponding ranges/distances. Once the power adjustment selection is determined, the transmission may be sent, using the identified power adjustment (block 706).

Figure 8:
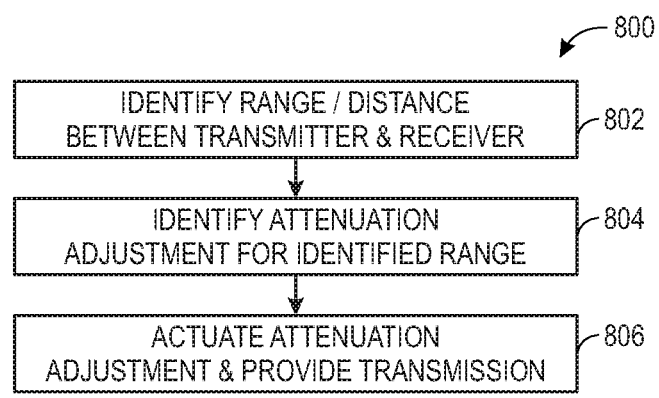
FIG. 8 is a flowchart, illustrating a process for dynamic attenuation of a dynamic short range FSO transmitter, in accordance with an embodiment of the present disclosure.

Returning to FIG. 6, in some embodiments, filters may attenuate a portion of the transmission beam, such that the receiver, at the determined location, is not saturated by the transmission beam. Additionally and/or alternatively, transmission beam steering may be adjusted to direct the beam (e.g., at a particular angle) to reach the receiver. FIG. 8 is a flowchart, illustrating a process 800 for dynamic attenuation of a dynamic short range FSO transmitter, in accordance with an embodiment of the present disclosure. As mentioned above, a range/distance between the transmitter and the receiver is identified (block 802). Based upon the identified range/distance, an attenuation adjustment selection is determined (block 804). For example, a data table may be indexed based upon range/distances. Additional data in the data table may indicate particular filters of a plurality of available filters to use for corresponding ranges/distances. Once the attenuation adjustment selection is determined, the transmission may be sent, using the identified attenuation adjustment (block 806).

Once the transmission parameters are identified, the transmitter may generate/modify a transmission based upon the identified parameters (block 606). For example, the transmitter may adjust the source power to an identified magnitude that is suitable for the receiver's location relative to the transmitter. In some embodiments, an attenuation filter may be selected and applied to the transmission source to alter an intensity of the transmission beam. Further, as mentioned above, transmission beam steering may be applied, by selecting one of a plurality of sources with a proper orientation and/or via mechanical actuation of the transmission beam source and/or transmission beam itself.

Once the transmitter is set with the identified parameters, data may be provided to the receiver via a short-range FSO transmission from the transmitter to the receiver (block 608). For example, the transmitter (or other component) may generate a light beam representative of the data and provide the light beam to the receiver.

As may be appreciated, the current techniques provide extensive benefit to short-range data transmission to receivers that do not maintain a stationary position. By providing a specialized FSO transmission system and/or receiver system, high-quality and high-bandwidth data transmission may be provided to non-stationary devices, such as vehicles. By adjusting transmission setting based upon characteristics of the receiver, far fewer transmission errors may be experienced during data transmission. Transmission streams are customized to a particular receiver and the receiver itself facilitates reception of the transmission.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instruction that, when executed by one or more processors of a short-range free space optical (FSO) transmitter, cause the short-range FSO transmitter to:
identify positional information related to an FSO receiver;
based upon the positional information, identify one or more dynamic transmission parameters applicable to a position of the FSO receiver; and
provide an FSO transmission directly to the FSO receiver using the one or more dynamic transmission parameters, wherein the FSO transmission comprises a light beam transmitted along a line of sight to the FSO receiver, the light beam representing electronic data.

2. The machine-readable medium of claim 1, comprising instruction that, when executed by the one or more processors, cause the short-range FSO transmitter to:
identify, as the positional information, a distance between the short-range FSO transmitter and the FSO receiver; and
identify the one or more dynamic transmission parameters based upon the distance between the short-range FSO transmitter and the FSO receiver.

3. The machine-readable medium of claim 2, comprising instruction that, when executed by the one or more processors, cause the short-range FSO transmitter to:
identify, as one the one or more dynamic transmission parameters, a transmission source power level.

4. The machine-readable medium of claim 2, comprising instruction that, when executed by the one or more processors, cause the short-range FSO transmitter to:
identify, as one the one or more dynamic transmission parameters, a particular one or more of a plurality of attenuation filters to apply to the FSO transmission.

5. The machine-readable medium of claim 1, comprising instruction that, when executed by the one or more processors, cause the short-range FSO transmitter to:
identify, as one the one or more dynamic transmission parameters, a particular beam steering to apply to the FSO transmission.

6. The machine-readable medium of claim 1, comprising instruction that, when executed by the one or more processors, cause the short-range FSO transmitter to:
identify, as the positional information, an orientation of the FSO receiver; and
identify the one or more dynamic transmission parameters based upon the orientation of the FSO receiver.

7. The machine-readable medium of claim 1, comprising instruction that, when executed by the one or more processors, cause the short-range FSO transmitter to:
receive, from a vehicle that the FSO receiver is attached to, an orientation of the vehicle; and
identify the orientation of the FSO receiver based upon the orientation of the vehicle.

8. The machine-readable medium of claim 1, comprising instruction that, when executed by the one or more processors, cause the short-range FSO transmitter to:
identify an orientation of a vehicle that the FSO receiver is attached to; and identify
the orientation of the FSO receiver based upon the orientation of the vehicle.

9. The machine-readable medium of claim 1, comprising instruction that, when executed by the one or more processors, cause the short-range FSO transmitter to:
receive an orientation of a vehicle that the FSO receiver is attached to; and identify
the orientation of the FSO receiver based upon the orientation of the vehicle.

10. The machine-readable medium of claim 9, comprising instruction that, when executed by the one or more processors, cause the short-range FSO transmitter to:
receive an indication of a particular FSO receiver of a plurality of available FSO receivers to target for providing the FSO transmission, wherein the particular FSO receiver comprises the FSO receiver; and
select the FSO receiver based upon the indication.

11. The machine-readable medium of claim 1, wherein:
the electronic data is provided to a vehicle;
the vehicle comprises a ride vehicle of an amusement ride; and
the electronic data comprises:
command data to actuate movement in a cabin of the ride vehicle, independent from an underlying transport system of the ride vehicle;
command data to facilitate presentation of lighting, audio, video, or the like from the ride vehicle; or
command data to facilitate provision of interactive features; or any combination thereof.

12. The machine-readable medium of claim 1, wherein:
the electronic data is provided to a vehicle;
the vehicle comprises an automobile; and
the electronic data comprises:
a firmware update to the automobile; or
a global positioning system map update to the automobile; or any combination thereof.

13. The machine-readable medium of claim 1, wherein:
the electronic data is provided to a vehicle; and
the electronic data comprises:
command data to adjust an operation of the vehicle;
command data to adjust a transport function of the vehicle; or any combination thereof.

14. A dynamic short-range free range optical (FSO) transmitter, comprising:

range detection circuitry configured to identify a distance range between the short-range FSO transmitter and a target FSO receiver;

transmission adjustment circuitry configured to adjust one or more transmission parameters based upon the distance range; and transmission generation circuitry configured to:
  identify data to be transmitted to the target FSO receiver; and generate and transmit an FSO transmission representing the data directly to the target FSO receiver, along a line of sight, in accordance with the one or more transmission parameters, wherein the FSO transmission comprises a light beam representing electronic data.

15. The dynamic short-range FSO transmitter of claim 14, wherein the transmission adjustment circuitry comprises:
  power adjustment circuitry configured to adjust an amount of power provided to the transmission generation circuitry based upon the distance range, such that the FSO transmission is of sufficient intensity to provide a quality representation of the data, yet does not saturate the target FSO receiver.

16. The dynamic short-range FSO transmitter of claim 14, wherein the transmission adjustment circuitry comprises:
  attenuation filter adjustment circuitry configured to select and apply an attenuation filter to the transmission generation circuitry based upon the distance range, such that the FSO transmission is of sufficient intensity to provide a quality representation of the data, yet does not saturate the target FSO receiver.

17. The dynamic short-range FSO transmitter of claim 14, wherein the transmission adjustment circuitry comprises:
  beam steering circuitry configured to adjust an orientation of the FSO transmission.

18. The dynamic short-range FSO transmitter of claim 17, wherein the beam steering circuitry is configured to select of one or more of a plurality of FSO transmission sources that will result in the orientation.

19. A dynamic short-range FSO receiver, comprising:
  a plurality of sensors, each oriented in different directions, enabling direct reception of a free space optical (FSO) transmission from a short-range FSO transmitter along a line of sight from a plurality of orientations, wherein the FSO transmission comprises a light beam representing electronic data; and
  a control system, configured to:
  receive the FSO transmission from the short-range FSO transmitter; and identify
  and store data represented by the FSO transmission in a tangible, non-transitory, machine-readable medium that is communicatively coupled to the dynamic short-range FSO receiver.

20. The dynamic short-range FSO receiver of claim 19, wherein the plurality of sensors are formed into a unified receiving device that is supported by a base.

* * * * *